LARRY S. CLICK
KERMIT Q. STEPHENSON
INVENTORS

BY Gray, Mase and
Dunson, ATTORNEYS

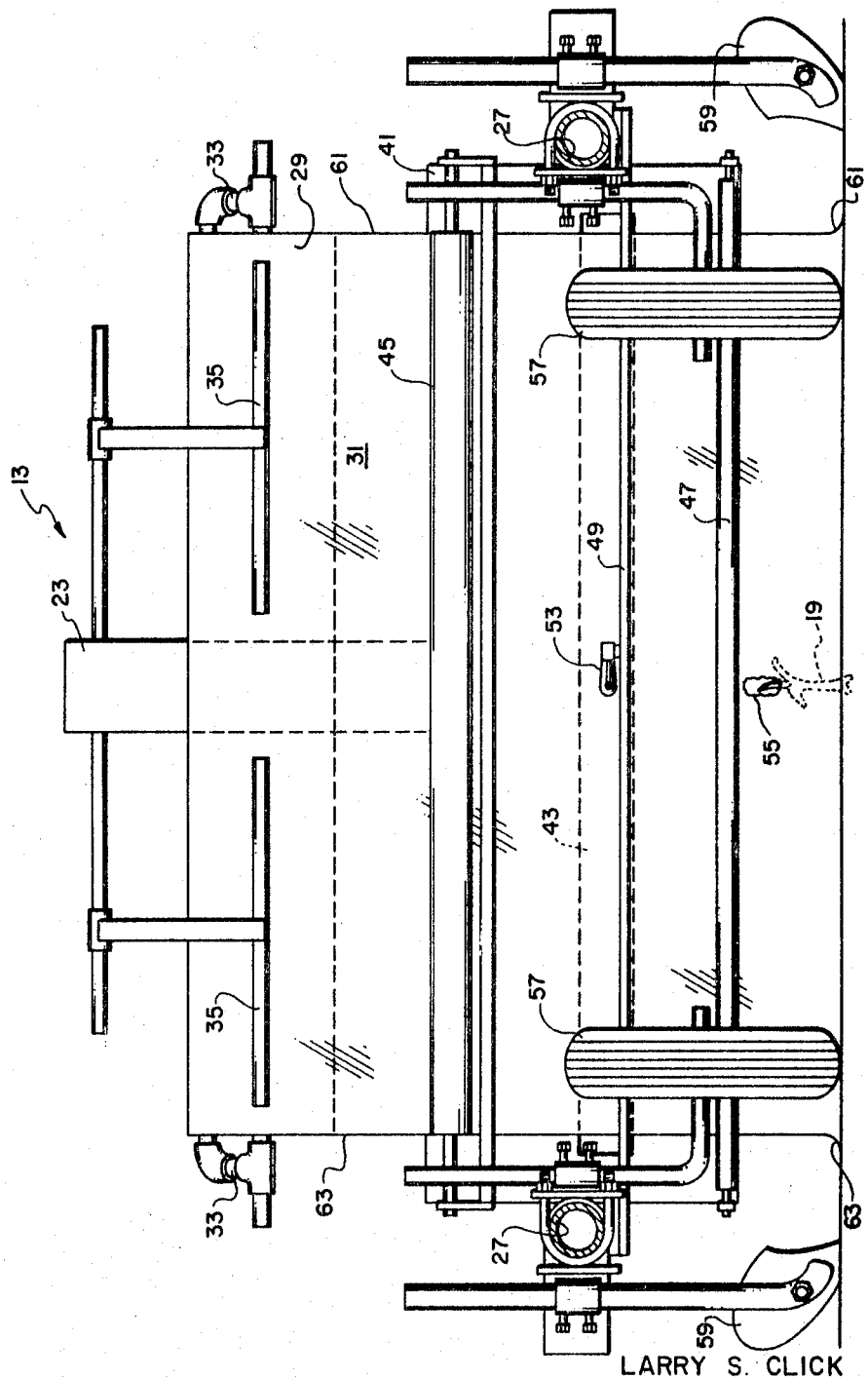

United States Patent Office 3,460,493
Patented Aug. 12, 1969

3,460,493
TRANSPLANTER MULCHER
Kermit Q. Stephenson, State College, and Larry S. Click, Boalsburg, Pa., assignors, by mesne assignments, to The Battelle Development Corporation, Columbus, Ohio, a corporation of Delaware
Filed Feb. 20, 1967, Ser. No. 617,270
Int. Cl. A01c *11/00*
U.S. Cl. 111—3                                       3 Claims

ABSTRACT OF THE DISCLOSURE

A wheeled apparatus plows a narrow trench, periodically places plants therein, compacts earth around each plant, and then dispenses over the ground a continuous sheet of plastic much in which a hole has been burned where each plant protrudes. Attached plows spread earth behind the rear wheels to hold the mulch in place.

---

This invention relates to apparatus for planting young plants and placing a layer of mulch around the plants. More particularly, this invention includes apparatus that plants seedlings or seeds and lays down a plastic film as mulch in one mechanized operation.

Considerable evidence has been found that polyethylene film used as a mulch is beneficial to crops such as tomatoes, peppers, beans, cucumbers, strawberries, and melons. The benefits of mulch vary for different crops and different geographic locations but, in general, mulching of crops with, for example, 1 mil. or 1.5 mil thickness of polyethylene film aids in: accelerating crop maturity and increasing crop yields, weed control, retention of soil moisture and erosion control, preservation of nutrients in soil and improving quality of fruit by reducing plant disease and insect damage. However, the most important factor is the earliness of crop maturity, which enables the grower to get the higher prices and the increased income resulting from more and better products.

The use of mechanical transplanters for field planting of seedlings has been accepted practice for many years. Presently, there are available commercial film applicators for applying mulching material. However, applying polyethylene film in conjunction with the transplanting operation has been rather cumbersome because of the necessary hand labor. If the film is applied ahead of the transplanter, it necessitates developing a means of punching or cutting a hole in the film and planting through this hole. With this method, it is difficult to obtain adequate compaction of the soil around the root zone of the plants. Also, compaction of soil after the film is applied tends to puncture the film and pull the outer edges of the film inward. The film is then susceptible to wind damage because of looseness.

The same problems of soil compaction and film damage are encountered when the plants are prepositioned in the mulch sheet as it is dispensed. This method also requires considerable manual labor or complicated machinery for locking said plants in the mulch sheet.

U.S. Patent 3,139,847, solves many of the simultaneous transplanting-mulching problems with an apparatus which, after planting and compaction, dispenses two sheets of mulching material that overlap at a point directly in line with the plants. The mulch sheets are then heat sealed together at the point of overlap with the excepion of those points where the plants extend through the mulch. Several problems, however, are still apparent. The quality of the seal at the overlap is frequently unacceptable causing the mulch to be susceptible to wind damage at the point of overlap. Such imperfections in the seal are not readily ascertainable at the time of applying the mulch and do not become apparent until some time later.

The dual sheet apparatus requires considerable time to train an operator before the apparatus can be used effectively. Also, the complicated nature of the apparatus results in frequent mechanical failures which often cannot be repaired by the ordinary user. Much of the farm machinery available at the present time is of such a complicated nature as to require specialized talents and considerable time for repairs. There is a definite need for simplicity and ease of operation in the farm implement field.

It is present practice to mechanically punch holes in the mulch to provide apertures for the plants. This method requires periodic sharpening of punches or dies which is complicated by the fact that said punches or dies are often difficult to remove. Also, various size punches must be procured if different size plants are to be planted. Often the punch method will cause the mulch to rip, tear, or unravel making it susceptible to wind damage.

This invention combines a transplanting mechanism, a mulch dispensing mechanism, and a mechanism for producing an opening in the mulch in a combination which provides simplicity of construction, ease of operation, and minimum probability of damage to the mulch, during application and afterwards.

The apparatus of this invention functions in the following manner. The basic components of a commercial transplanter are used to place the plants in the soil at predetermined interspaced intervals in a row along the line of progress of the planter, assuring good compaction of soil around the plant roots. Immediately behind the planter press wheels, or compaction wheels, plastic mulching material is dispensed through a system of guides to provide a continuous mulch for the plants. The outer edges of the film are secured by a system of small plows and press wheels. In order to provide appropriate openings in the film for the plants, an electrically synchronized mechanism is provided for making an opening in the film at the appropriate time so that such openings substantially coincide with the location of each transplant.

More specifically, the mechanism for producing openings in the mulch includes radiant energy sources, such as tungsten filament lamps, and a system for condensing the emitted energy so that a beam of radiant heat is formed at a point on the mulch sheet which subsequently corresponds to the position of the transplant. The radiant heat burns a slit in the mulch sheet. The burning device is synchronized with planting and planter speed to locate the openings at the desired positions.

Among the advantages of this invention already apparent are a reliable method of making slits of the desired size for each type of plant, mechanical simplicity, and economy. Other advantages include savings in labor, the adaptability of the apparatus to multi-row planting with a single sheet of film, and ease and speed of operation. Still other advantages of the invention are apparent from the following specification, the drawings, and the claims herein set forth.

In the drawings:

FIG. 2 is an end view of the apparatus;

Figure 1:
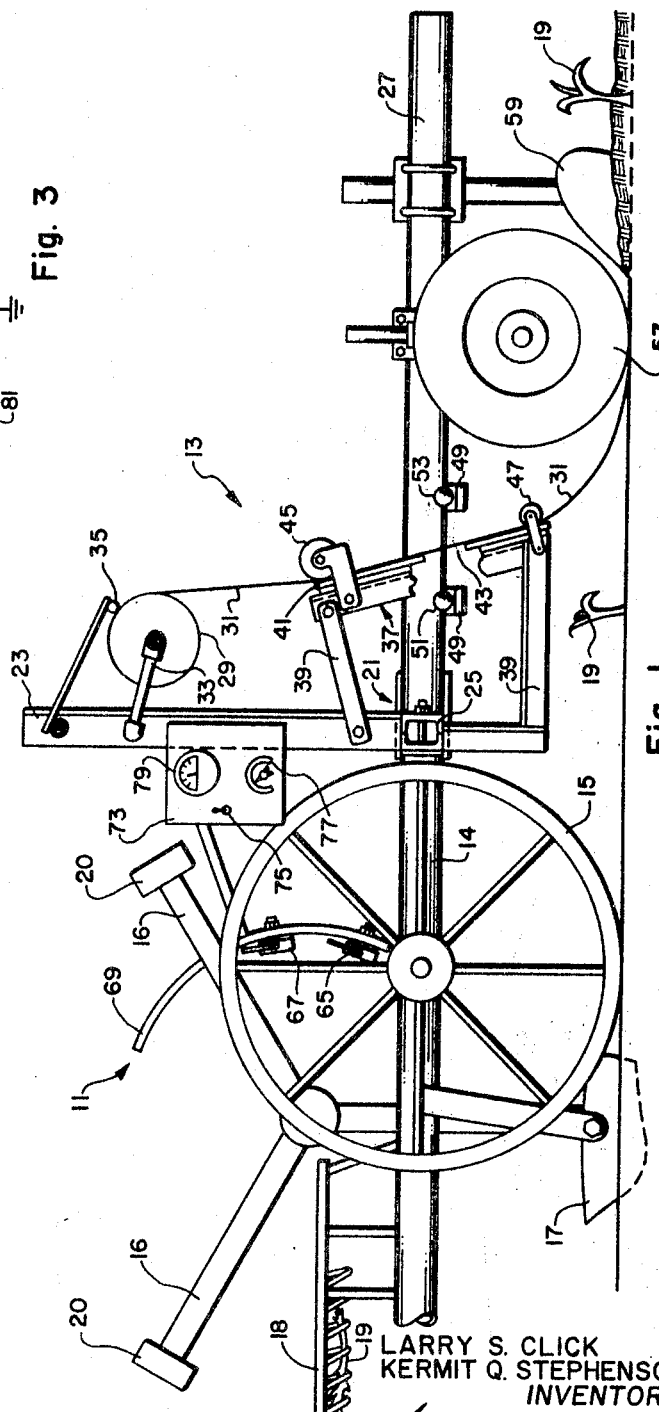
FIG. 1 is a side elevational view of the apparatus of the invention having a portion removed for clarity.

Referring to FIGS. 1 and 2, the transplanter mulcher apparatus includes a transplanter 11 and the mulch applying apparatus 13. Only the necessary parts of the transplanter 11 are shown which are the transplanter main support member 14, the transplanter compaction or packer wheel 15 (only one shown), the transplanter plant arms 16—16, the transplanter plow 17 and the plant tray 18.

The transplanter portion or transplanting apparatus 11 functions in the conventional manner by ensuring that the young plants 19 are properly placed in the soil. The plow 17 first opens a narrow trench. An operator riding on the planter places a young plant 19 in the plant tray 18. A planter arm having a pair of plant holders 20—20 (preferably of soft material such as rubber) picks the plant 19 out of the plant tray 18 and passes between the blades of the plow 17 releasing the plant 19 as it is inserted into the narrow trench formed by the plow 17. The plow 17 is shaped so that the trench it forms tends to close in behind the plow 17. The soil is additionally pushed around the plant 19 by the compaction wheels 15—15 which straddle the trench and force the trench closed, packing the soil firmly around the plant. The result is that the plants are positioned at predetermined spaced intervals in a row along the line of progress of the planting apparatus.

The particular form of transplanter as shown and described herein is shown only as an example of a transplanter that is workable and adaptable to the mulch applying apparatus. However, other forms of transplanters may be used in the combination of this invention.

The frame 21 of the mulch applying apparatus 13 is attached to the transplanter main support member 14. The main components of the mulcher frame 21 are a vertical frame member 23, a cross member 25 and two horizontal bars 27—27 (only one is shown in FIG. 1) attached to cross member 25.

A roll 29 pays out a sheet 31 of mulching material and is mounted on adjustable supports 33—33 that are attached to the vertical frame member 23. Tension on the plastic sheet 31 is maintained by drag bars 35—35 that bear on the film roll 29.

After leaving the film roll 29, the film sheet 31 passes through a guide assembly 37 that is attached to the frame 21 of the mulcher 13 by suitable support arms 39—39. The guide assembly 37 includes a guide plate 41 with a horizontal opening 43, upper control roller 45, and a film pressure rod 47. The upper control roller 45 and film pressure rod 47 are adjustable to control the tension of the film sheet 31.

Energy source support bars 49—49 are attached to the horizontal bars 27—27, one on each side of the guide assembly 37. Two radiant energy sources 51 and 53 (or more if multi-row planting is desired) are attached to support bars 49—49. The energy sources 51 and 53 are adjustable for positioning of the slit. Energy source 51, which is located behind the guide assembly 37, is focused through horizontal opening 43 to a point on mulch sheet 31. Energy source 53, which is in front of the guide assembly, is focused at the same point as energy source 51 on sheet 31. The combined heat of energy sources 51 and 53 burns a hole or slit 55 in sheet 31. The focusing of energy sources may be done with an optical system or with prefocused energy sources.

As shown in FIG. 2, the mulch sheet such as plastic film sheet 31 leaves roll 29 and passes between the film guide plate 41 and upper control roller 45. At selected positions, the energy sources are activated to produce a slit 55 in the film sheet that fits over a plant 19. After the sheet passes beneath the film pressure rod 47 and passes over plant 19, it is held tight to the soil by press wheels 57—57 that are mounted on the horizontal bars 27—27 of the mulcher 13. Also mounted on the horizontal bars 27—27 are plows 59—59 that push earth over the outside edges 61 and 63 of the plastic sheet 31 anchoring the sheet to the ground. Thus a layer of mulch is deposited on the soil around the plants 19—19.

The energy sources are controlled by the activation of two microswitches 65 and 67 mounted on a curved bar 69 that is adjacent to the planter arm 16, both curved bar 69 and microswitches 65 and 67 being adjustable for length and spacing of the burned slit 55 in order that the slit be synchronized with plant size and spacing as desired. As the plant arm 16 moves, it passes over the microswitches 65 and 67 activating them, and the microswitches 65 and 67, in turn, activate the energy sources.

Figure 3:
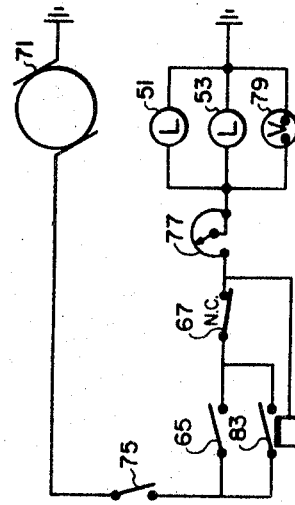
FIG. 3 is a diagram of the electrical control circuit.

FIG. 3 is a schematic diagram of the electrical circuit that controls the burning system. The power for the various components is obtained from a suitable source, such as a tractor engine driven, or separately driven generator 71. The control panel 73 for the electric circuit is mounted on vertical frame member 23 shown in FIG. 1. A main switch 75 supplies current to the system. The rheostat 77 is used to control the voltage supplied to the energy sources 51 and 53 and the voltage is determined by a voltmeter 79 connected across the energy sources 51 and 53. Microswitch 65 is normally open and microswitch 67 is normally closed. When the plant arm 16 contacts microswitch 65, the switch 65 is closed and activates the energy sources 51 and 53 through normally closed microswitch 67. At the same time, a relay 81 is activated and closes points 83. When points 83 are closed, the current bypasses microswitch 65 so that when switch 65 returns to its normally open position, the energy sources 51 and 53 remain activated. The arm 16 moves further and contacts normally closed microswitch 67, opening switch 67 and interrupting the current to the relay 81 and energy sources 51 and 53. The circuit thus remains open until microswitch 65 is activated again. The energy sources 51 and 53 are activated for the time period that it requires for the plant arm 16 to pass over and between the microswitches 65 and 67. The switches 65 and 67 are positioned so that the film slits 55 are created at a proper time to allow for plant 19 passage.

Although other burning mechanisms and systems are possible, such as heated irons or gas flames, and are included within the scope of this invention, the optical system described herein is preferred from a standpoint of operational ease, cost, and reliability. The burning system is affected very little by ambient temperature changes and is especially adapted for control of burning rate to accommodate various sizes of plants.

It will be understood, of course, that, while the form of the invention herein shown and described constitutes the preferred embodiments of the invention, it is not intended herein to illustrate all of the possible equivalent forms or ramifications of the invention. It will also be understood that the words used are words of description rather than of limitation, and that various changes, such as changes in shape, relative size, and arrangement of parts may be substituted without departing from the spirit or scope of the invention herein disclosed.

We claim:

1. Apparatus for planting and depositing mulch around plants comprising, in combination:
   (a) a frame structure adapted to be moved across the soil;
   (b) a planting station mounted on said frame for depositing plants in the soil at predetermined spaced intervals in a row along the line of progress of the apparatus;
   (c) compacting means positioned behind said planting station for compacting the soil around the root zone of the plants;
   (d) a supply of mulch sheet carried on said frame;
   (e) guide means mounted on said frame to guide said mulch sheet for deposition upon the soil after compaction by said compacting means, said guide means being adapted to maintain at least a portion of said mulch sheet substantially taut;
   (f) means for feeding said mulch sheet through said guide means;
   (g) burning means, mounted on said frame, comprising at least one source of radiant energy spaced from and optically focused at a point on the taut portion of said mulch sheet; and (h) control means, synchronized with the speed of advance of the apparatus, for periodically admitting radiant energy from said radiant energy source to said mulch sheet for a period of time sufficient to burn a plant growth hole of predetermined size in the mulch sheet at a position corresponding to the position of a plant in the soil.

2. Apparatus for planting and depositing mulch around plants in accordance with claim 1, wherein the energy sources are tungsten filament lamps.

3. Apparatus for planting and depositing mulch around plants in accordance with claim 1, wherein said control means is activated synchronously by a triggering mechanism associated with said planting station.

References Cited

UNITED STATES PATENTS

| | | | |
|---|---|---|---|
| 2,708,812 | 5/1955 | Nakai | 47—9 |
| 3,020,859 | 2/1962 | Kang | 111—3 |
| 3,139,847 | 7/1964 | Bucher et al. | 111—3 |
| 3,161,163 | 12/1964 | Cosner et al. | 111—3 |
| 3,175,524 | 3/1965 | Kappelmann | 111—91 |
| 3,176,635 | 4/1965 | Mabon | 111—3 |
| 3,180,290 | 4/1965 | Kappelmann et al. | 47—9 XR |
| 3,293,797 | 12/1966 | Kappelmann et al. | 47—9 |
| 3,333,557 | 8/1967 | Kappelmann et al. | 111—91 |

ROBERT E. BAGWILL, Primary Examiner

U.S. Cl. X.R.

47—9; 83—170; 219—384; 264—156